United States Patent

Benson

[15] 3,648,752
[45] Mar. 14, 1972

[54] TIRE SLITTING MACHINE

[72] Inventor: Merle K. Benson, Freeport, Ill.
[73] Assignee: Howard W. Brown, Dubuque, Iowa a part interest
[22] Filed: Apr. 10, 1970
[21] Appl. No.: 27,232

[52] U.S. Cl. .............................................................157/13
[51] Int. Cl. .........................................................B29h 21/01
[58] Field of Search .....................................................157/13

[56] References Cited

UNITED STATES PATENTS

| | | | |
|---|---|---|---|
| 2,504,090 | 4/1950 | Sanderson | 157/13 X |
| 2,570,540 | 10/1951 | Furnald | 157/13 |
| 2,623,591 | 12/1952 | Furnald | 157/13 |
| 2,940,489 | 6/1960 | Feiner | 83/665 X |
| 2,968,344 | 1/1961 | Kuts et al. | 157/13 |
| 3,527,393 | 9/1970 | Matsui et al. | 225/97 |
| 3,018,822 | 1/1962 | Noall, Jr. | 157/13 |

*Primary Examiner*—Granville Y. Custer, Jr.
*Attorney*—Andrew F. Wintercorn

[57] ABSTRACT

The slits for tractionizing purposes are cut in the thread portion of a rubber tire transversely thereof to a substantially uniform width and depth radially of the tire and spaced transversely and circumferentially of the tire tread, so that each slit serves as a suction cup as the slit opens upon coming in contact with the pavement under the load of the vehicle. The edges of the open slits extending transversely of the thread also give considerable added traction that is highly beneficial both in driving and in braking. These slits are produced by running the wheels of a vehicle onto cylindrical rotary cutter heads that are supported for rotation in a predetermined spaced parallel relation to cylindrical rollers to which drive is transmitted during the tractionizing operation, or two cutter heads may be used with cutter disks in staggered relation for efficient slitting of the tire tread, drive being applied to one of these two heads. The sectional construction of the cutter heads with stamped cutter disks spaced by washers on spindles is economical and enables low cost replacement of worn cutter disks, and the washers serve to limit the depth of slitting. This construction also permits placing in abutting relation several cutter disks to secure the desired width of slits, or the triangular teeth of the disks can be bent laterally on opposite directions to get a similar effect, still using the washers as spacers and to limit the depth of slitting.

13 Claims, 16 Drawing Figures

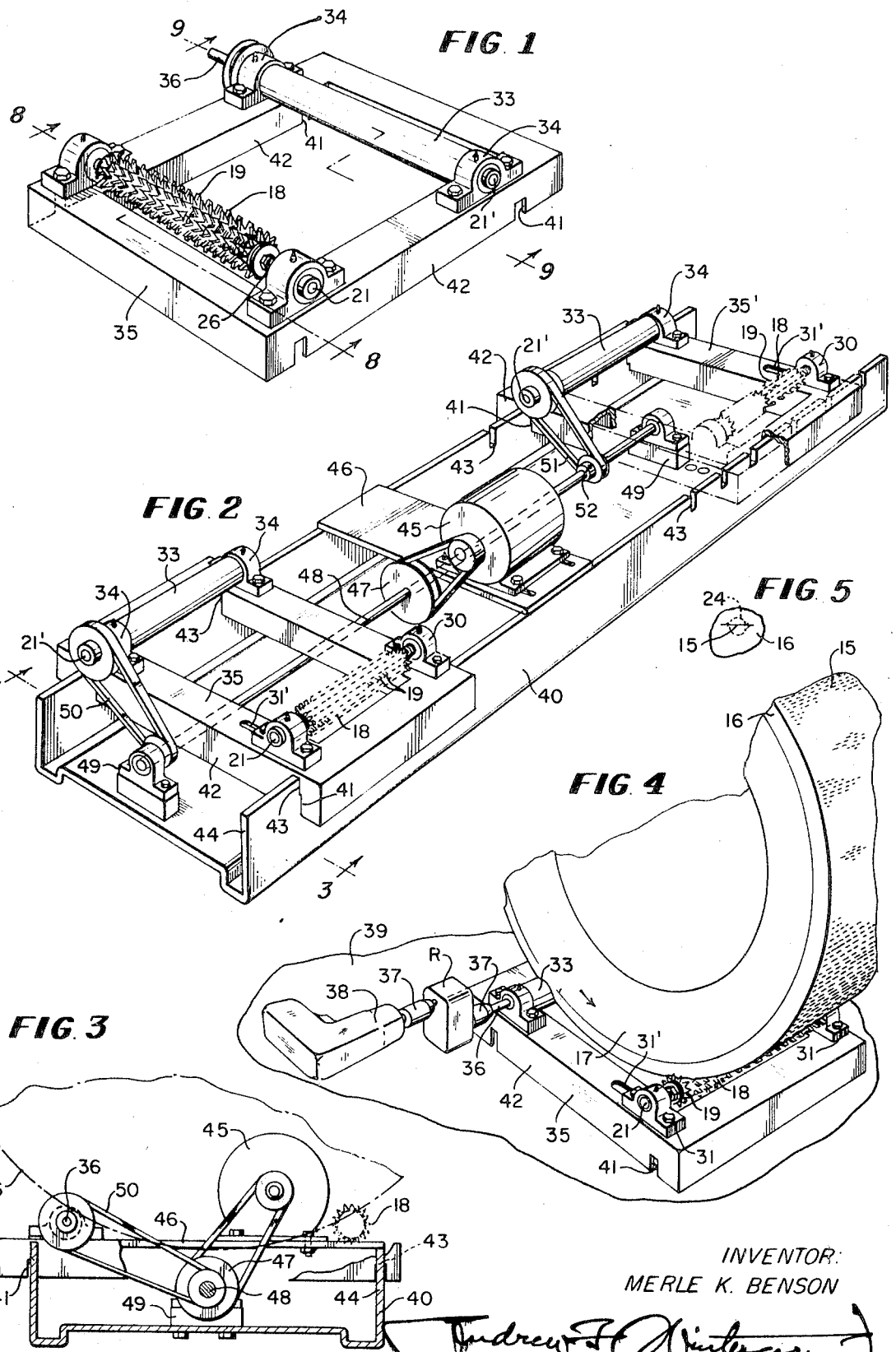

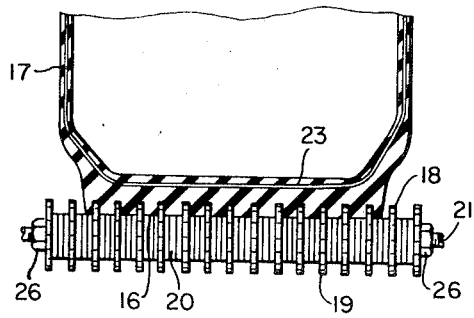
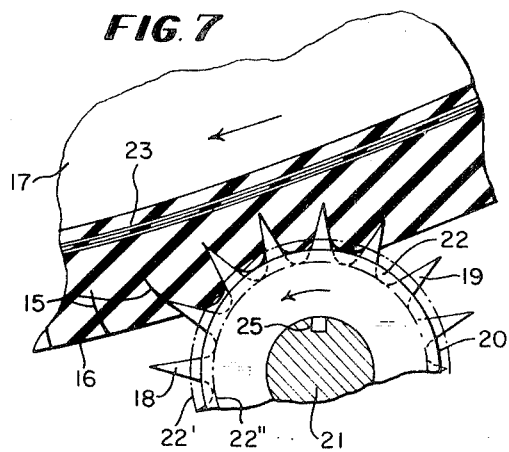
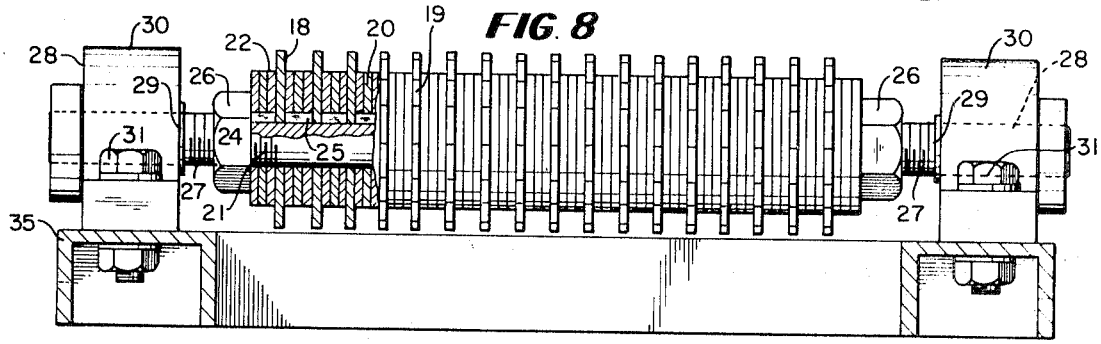
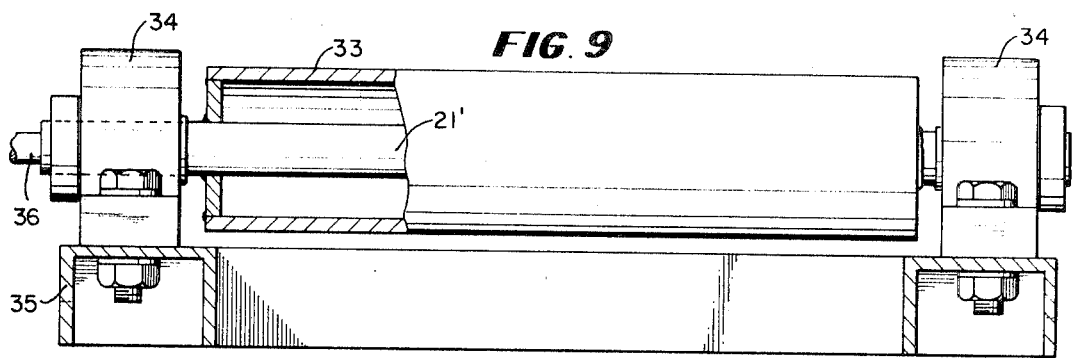
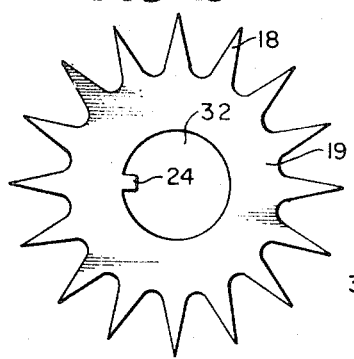
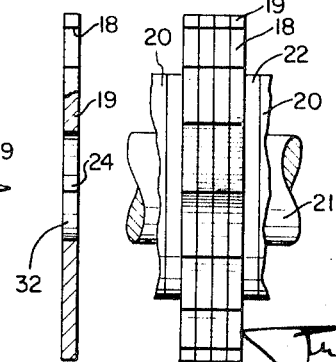
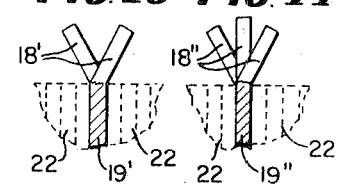
INVENTOR:
MERLE K. BENSON
ATTORNEY

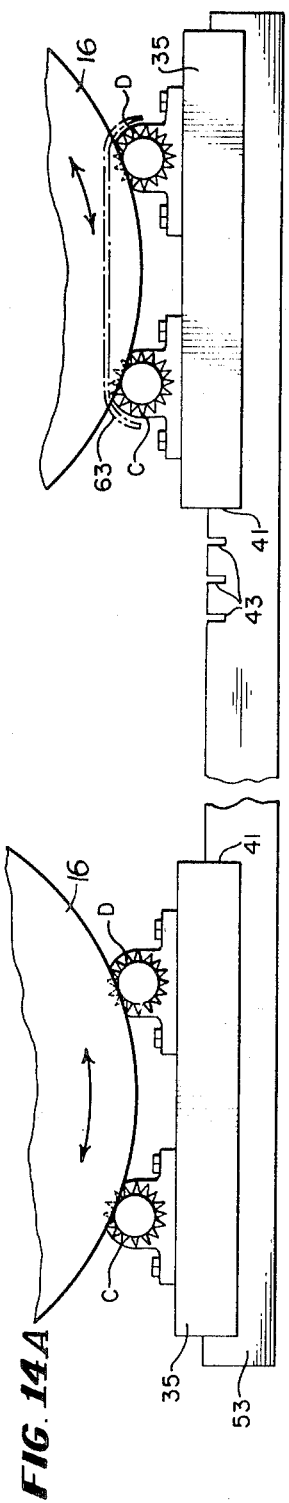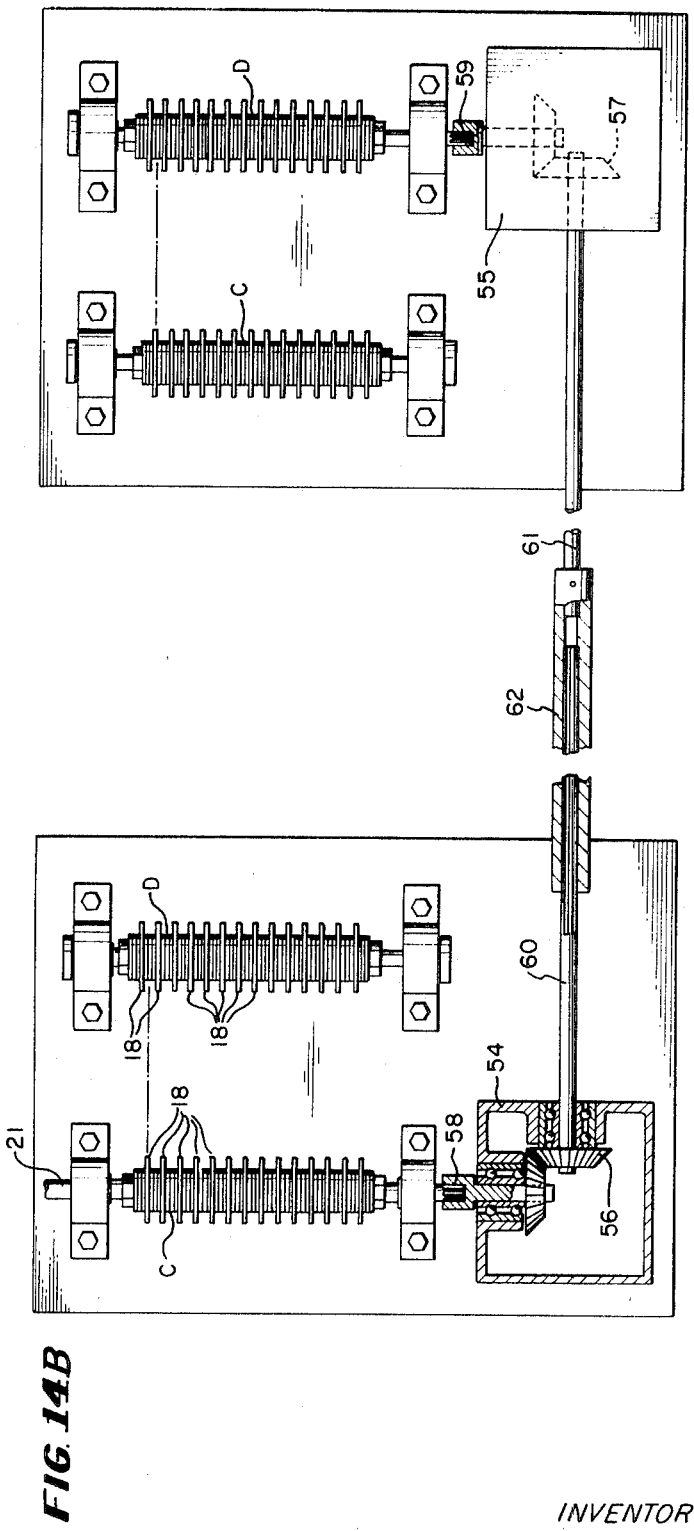
FIG. 14A
FIG. 14B
INVENTOR:
MERLE K. BENSON
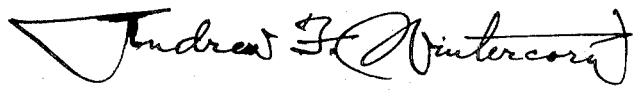
ATTORNEY

TIRE SLITTING MACHINE

This invention relates to vehicle tire tread tractionizers and is more particularly concerned with improvements in the design and construction of the tread tractionizing cutter and spacer assemblies using stamped replaceable parts of novel design adapted to be put together in tractionizer rolls in different novel ways, as well as in novel single wheel tractionizer units, and in the universally adjustable apparatus using pairs of these units.

A salient feature of the invention is my improved method consisting in making each tractionizing cut of a predetermined width measured transversely of the tire tread, as distinguished from merely making circular incisions or punctures of no really measurable diameter substantially radially using generally conical points or pointed cylindrical elements or in making transverse slits crosswise of the tread, neither of which methods produce any noticeable suction cup effect such as I produce where each transverse cut is spread open when coming into contact with the pavement. The importance of the transverse slitting lies not only in the increased suction cup action that is so important for the car's holding the road and staying on a straight line of travel, but also from the standpoint that the edges of the opened slits, which extend transversely of the tread also give considerable added traction that is so important in both driving and braking.

The invention is illustrated in the accompanying drawings, in which:

FIG. 1 is a perspective view of a tractionizer unit made in accordance with my invention adapted to be used singly, driven by the engine driven wheel or by a separate power tool motor, as in FIG. 4, or used in pairs, as in FIGS. 2 and 3;

FIG. 2 is a perspective view of an electric motor driven apparatus using two units for the tractionizing of the tires on a pair of wheels simultaneously, the one unit being readily adjustable laterally toward and away from the other unit to adapt to different width cars;

FIG. 3 is a cross-section on the line 3—3 of FIG. 2;

FIG. 4 is a broken away perspective of a single unit like that of FIG. 1, illustrating the tractionizing of the tread of a tire with the drive roller illustrated as driven through a suitable reduction gear unit detachably connected to the spindle of the drive roller in lieu of a pulley for belt drive;

FIG. 5 is an enlarged illustration of one slit in the tire tread as made by my method of tractionizing, illustrating in dotted lines how each slit is converted into a separately effective suction cup when it comes into contact with the pavement and is thereby spread;

FIGS. 6 and 7 are sections at right angles to one another and on different scales to better illustrate the tractionizing operation;

FIG. 8 is an enlarged sectional detail of the tractionizer roller taken on the broken line 8—8 of FIG. 1;

FIG. 9 is a similar view of the smooth drive roller taken on the broken line 9—9 of FIG. 1;

FIGS. 10 and 11 are two views of a single cutter disk taken at right angles to each other, the one broken away to illustrate a portion in section;

FIG. 12 shows how a number of these cutter disks may be used in abutting relationship with spacer washers between each group in lieu of using these cutter disks singly as in FIG. 8, with spacer washers therebetween;

FIGS. 13 and 14 illustrate two variations useful in lieu of the design of FIG. 12, alternate teeth on the disk of FIG. 13 being bent uniformly one way at an acute angle and the intermediate teeth bent in the other direction at the same acute angle, while the teeth in FIG. 14 have a third tooth between each pair of angled teeth extending radially in the plane of the disk, spacer washers being used, of course, between neighboring cutter disks of either design, as indicated in dotted lines;

FIG. 14A shows how two cutter heads may be used in spaced parallel relation on each of a pair of bases in lieu of the other arrangements shown in FIGS. 1, 2 and 3, and FIG. 14B is a plan view of FIG. 14A showing both how the drive transmitted to one of a pair of cutter heads is transmitted to one of the other pair, with freedom to adjust the frames toward or away from one another to suit different sizes of cars having different wheel bases, and also showing the staggered arrangement of the cutter disks in each pair of cutter heads.

Similar reference numerals are applied to corresponding parts throughout the views.

Referring to the drawings, and at first mainly to FIG. 5, I have shown here an isolated transverse slit or cut 15 of a predetermined depth in the tread 16 of a vehicle tire 17, such cuts being made in laterally and circumferentially spaced relation in accordance with my method by the radially projecting generally triangular shaped sharply pointed teeth 18 of the cutter disks 19 mounted in axially spaced relation between washers 20 on the spindles 21, with only a predetermined amount of each tooth projecting beyond the periphery 22 of the washers, to predetermine the depth of cut and positively eliminate any likelihood of penetrating the cords in the inner tire wall 23. Less extension of the teeth for less depth of cut is indicated at 22' in FIG. 7, and more at 22'', by merely selecting the proper washer diameter. I have obtained a far superior result than that obtained by any previous tractionizing apparatus, due to the fact that when each slitted portion arrives at the pavement it is forced open more or less to the extent illustrated in dotted lines at 24 in FIG. 5, thereby providing a separate suction cup at each slit as well as providing a separate squeegee edge on each side of a cut, one effective with the suction cup in transmitting drive and the other with the suction cup in braking. Prior tractionizers cannot obtain this objective for the reason that they provide conical pins as in Sanderson U.S. Pat. No. 2,504,090 or Furnald U.S. Pat. No. 2,623,591, or equally ineffective pointed cylindrical pins like those shown in Anderson U.S. Pat. No. 2,734,568, the holes produced by these projections being incapable of spreading when the tread comes into contact with the pavement, but being more likely to clog and to thus become totally ineffective, while the transverse slits of Meserve U.S. Pat. Nos. 2,741,307, 2,863,507, 2,924,267 and 3,039,520, even if they are cut to an equivalent depth in the tread are obviously incapable of giving any effective suction cup operation due to the slits being open at both ends. The latter, it is believed, obtain only a squeegee action for improved traction and braking, but I also obtain that action to some extent, the amount depending upon the length and depth of the cuts.

The cutter disks 19 each preferably have a key projection 24 entered in a key-way 25 in the spindle 21. Nuts 26 thread on end portions 27 to hold the cutter disks and spacer washers in tight assembled relationship, and there are trunnions defined by coaxially reduced terminal end portions 28 onto which the inner race members 29 of ball bearings received in the bearing supports 30 are suitably secured, the outer race members of these ball bearings being secured to said bearing supports 30, thereby positively limiting endwise movement of the tractionizer roller with respect to the bearings and still making it a fairly simple matter by dismounting one of the bearing supports 30 by removal of its fastening screws 31 to remove a tractionizer roller and disassemble it for replacement of whatever cutter disks 18 might need replacement after some extent of service.

The way the present cutter disks 18–19 are punched from flat sheet stock and suitably heat-treated to the desired hardness before being slipped onto the spindle 21 and spaced from other cutter disks by washers 20, it becomes a fairly economical matter to keep a tractionizer roller operating always at high efficiency and makes tractionizing of ordinary tires a highly profitable business in relation to the old practice of buying special snow tires for winter driving especially now with the higher labor costs involved in removing existing tires to replace them with snow tires and then having to balance the wheels after the snow tires are on, which means a further sizeable service charge, whereas tractionizing of existing tires can be done at a small fraction of the other costs.

A variation in the use of the flat cutter disks 18-19 is shown in FIG. 12, where a number of these disks are stacked to obtain the desired thickness 'f the final cutter disk for tractionizing of large heavy duty truck tires. Also, in lieu of such stacking of a number of cutter disks, I may, as shown in FIG. 13, provide cutter disk 19' the triangular shaped cutter teeth 18' of which are bent at acute angles with respect to the plane of the disk, alternate ones in one direction and intermediate ones in the opposite direction, or, as I have shown in FIG. 14, with the disk 19'', I may have teeth like those shown at 18'' where two of each set of three teeth are like the two shown in FIG. 13, but there is provided between these two teeth a third straight tooth in the plane of the disk, the same as in FIGS. 10 and 11. It will be understood that the disks 19' and 19'' are otherwise the same as the disks 19 of FIGS. 10 and 11 including the provision of the key-projections 24 in the center holes 32.

In operation, a smooth idler roller 33 is mounted similarly as the tractionizer rollers 18-19 in antifriction bearings 34 in a predetermined fore and aft spaced parallel relationship to the tractionizer roller 18-19 on rectangular metal channel frames 35 and the, if, let us say, a single tire is being tractionized at a time and there is only a single unit being used, the tire on each of the rear wheels to be tractionized is run onto the unit, as in FIG. 4, and one may use the power of the engine to drive this wheel only long enough to be certain that the tread thereof has been properly tractionized. On the other hand, the reduced axial extension 36 provided on one end of the spindle 21' of the idler roller 33 can be driven by detachable connection of chuck 37 on the output spindle of a reduction gear unit R whose input spindle is detachably connected by a chuck 37' to an electric drill 38, as in FIG. 4, and thus serve to drive the wheel while the drill is resting on the floor 39.

In most cases, however, from the standpoint of economy, the tires of both wheels of a pair are tractionized simultaneously, using an apparatus like that shown in FIG. 2, where the left-hand frame 35 is usually fixed with respect to the base 40 but the frame 35' of the other unit in laterally spaced relationship to the first unit is arranged to be adjusted laterally with respect to the first mentioned frame to suit the spacing of the wheels, and thus accommodate everything from small "compacts" on up to wide track cars and trucks. Slots in the frames 35 and 35' indicated at 31' permit adjusting the bearings for heads 18-19 relative to idlers 33 to suit different diameter of tires. Each of the frames 35 and 35' has vertical slots 41 extending upwardly about half the height of both the side flanges 42 of the channels thereof to fit in correspondingly spaced slots 43 provided in the upper edges of the front and rear flanges 44 of the base 40 to hold the left- and right-hand units securely in their set position, the right-hand unit being settable in any one of a plurality of positions by virtue of the number of uniformly spaced vertical slots 43 provided at that end of the base 40. The base 40 carries an electric motor 45 on a transverse support 46 at a mid-position and this motor has a belt and pulley drive indicated at 47 with a longitudinally extending drive shaft 48 carried in bearings 49 provided at its opposite ends, one end of the shaft 48 having a fixed belt and pulley drive connection 50 with the left-hand idler roller 33, while the other end of the shaft 48 has an adjustable belt drive connection 51 with the other idler roller 33 of the right-hand unit. It is, of course, a simple matter to remove and replace the belt when the right-hand unit has to be set over farther to the left or right from the position shown to permit shifting that unit to the required position before reestablishing the belt and pulley connection 51 with the idler roller 33 thereof, the pulley on shaft 48 being, of course, easily adjustable by loosening its screw 52 to suit the new location of frame 35'. It will be evident that where electrical current is not available easily, the belts at 50 and 51 can be removed and the wheels resting on the tractionizer can be driven by the car's engine at slow speed using rollers 33 as idlers. Also, while the tractionizing of the tires on the two drive wheels (front and rear) is most important, the apparatus of FIG. 2 enables doing it on all four.

In conclusion, referring to FIGS. 14A and 14B, speedier tractionizing can be accomplished using two cutter heads in spaced parallel relationship, as at C and D on the two frames 35 mounted on the front and rear ends of the longitudinally extending base frame 53 for adjustability of at least one of the frames relative to the other, as indicated by the slots 43 adjacent the front frame at the right that register with slots 41 in the frame 35, similarly as in FIG. 2, to accommodate cars of different lengths, the bearings for the cutter heads C and D being also adjustable on both frames 35 toward and away from one another to accommodate different diameters of tires, as previously described in reference to frames 35 and 35' in FIG. 2. It is important to note that the cutter disks 18 on each pair of cutter heads are disposed in staggered relationship, as seen in FIG. 14B, so that slits 15 are cut in the tire treads the full width of the tread portion in uniformly laterally spaced relation, giving the same results, in other words, as if one cutter head in the combination shown in FIGS. 2 and 4, for example, was used in two settings, but the work is done in half the time otherwise required. Now, assuming spindle 21 for the one cutter head C is electric motor driven using a drive setup similar to that shown in FIG. 2 with an electric motor disposed between the right- and left-hand units, it is clear that with two gear boxes 54 and 55, each containing intermeshing bevel gears, as at 56 and 57, respectively, a splined connection 58 for spindle 21 at the rear end of the car and a similar splined connection 59 for the other spindle at the front end of the car enables quickly connecting or disconnecting the drive between cutter heads at both ends of the car, as the shafts 60 and 61 transmitting drive between gearing 56 and 57 have a slidably adjustable spline connection with the intermediate sleeve 62 to provide for different space relationships of the front and rear frames 35. Of course, if only the tires on the rear wheels are to be tractionized, the gear box 54 can be pulled out to disconnect the power take-off for driving the cutter heads C and D at the front end. In such case, cover plates may be provided over those heads, as shown in dotted lines at 63 in FIG. 14A.

It is believed that the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. Apparatus for producing a multiplicity of substantially parallel slits transversely of the tread and of a predetermined depth and width in laterally and circumferentially spaced relation in and substantially radially of the tread portion of a vehicle rubber tire throughout the circumference thereof, the depth and width of all slits being sufficient to substantially improve traction and braking, said apparatus comprising a rotary cylindrical cutter head adapted to be placed in pressurized rolling contact with the tire tread and having a multiplicity of substantially radially projecting cutter teeth having straight cutting edges substantially parallel to the axis of the cutter head and in evenly circumferentially spaced relation relative to said cutter head as well as in spaced relation to one another longitudinally of the cutter head so that a plurality of rows of slits of the kind mentioned, for tractionizing purposes, can be cut transversely of the tread in transversely spaced relation all around the circumference of the tread portion of the tire, and means for supporting said cutter head for rotation, the slit cutting teeth which are of generally triangular form being provided in circular series, each series in circumferentially spaced relation on a cutter disk, the disks being assembled in coaxially spaced relation on a spindle with spacer washers therebetween limiting the depth of penetration of the cutting teeth.

2. Apparatus as set forth in claim 1 wherein the cutter disks are keyed to the spindle to prevent their turning relative thereto.

3. Apparatus as set forth in claim 1 wherein a plurality of said disks are placed in abutting relation with their cutting teeth in register to provide the desired width of cut.

4. Apparatus as set forth in claim 1 wherein the cutter disks have some teeth bent laterally in one direction at an acute angle and other teeth bent laterally in the opposite direction at an acute angle.

5. Apparatus as set forth in claim 1 wherein the cutter disks have alternate teeth bent laterally in one direction at an acute angle and intermediate teeth bent laterally in the opposite direction at an acute angle.

6. Apparatus as set forth in claim 1 wherein the cutter disks have some teeth bent laterally in one direction at an acute angle and other teeth bent laterally in the opposite direction at an acute angle, still other teeth being straight and lying in the plane of the disks.

7. Apparatus for producing a multiplicity of substantially parallel slits of a predetermined depth and width transversely of the tread and in laterally and circumferentially spaced relation in and substantially radially of the tread portion of a vehicle rubber tire throughout the circumference thereof, the depth and width of all slits being sufficient to improve traction and braking, said apparatus comprising a pair of spaced parallel rotary cylindrical cutter heads adapted to be placed in pressurized rolling contact with the tire tread, each head having a multiplicity of substantially radially projecting cutter teeth having straight cutting edges substantially parallel to the axis of the cutter head and in circumferentially spaced relation relative to said cutter head as well as in spaced relation to one another longitudinally of the cutter head so that a plurality of rows of slits of the kind mentioned, for tractionizing purposes, can be cut in transversely spaced relation all around the circumference of the tread portion of the tire, the cutter teeth of one cutter head being in planes between the cutter teeth of the other cutter head, and means for supporting said cutter heads for rotation, the slit cutting teeth which are of generally triangular form being provided in circular series, each series in circumferentially spaced relation on a cutter disk, the disks being assembled in coaxially spaced relation on a spindle with spacer washers therebetween limiting the depth of penetration of the cutting teeth.

8. Apparatus as set forth in claim 7 wherein the washers are of a smaller diameter in relation to the diameter of the cutter disks, but large enough to limit to a predetermined amount the extent of penetration of the teeth in cutting the slits.

9. Apparatus as set forth in claim 7 wherein the cutter disks are keyed to the spindle to prevent their turning relative thereto.

10. Apparatus for producing a multiplicity of substantially parallel slits transversely of the tread and of a predetermined depth and width in laterally and circumferentially spaced relation in and substantially radially of the tread portion of each of a pair of vehicle rubber tires throughout the circumference thereof, the depth and width of all slits being sufficient to improve traction and braking, said apparatus comprising a pair of spaced generally rectangular horizontal supporting frames each with a pair of spaced parallel rotary cylindrical cutter heads rotatably supported thereon on spindles, each head having a multiplicity of substantially radially projecting cutter teeth having straight cutting edges substantially parallel to the axis of the cutter head and in circumferentially spaced relation relative to said cutter head as well as in spaced relation to one another longitudinally of the cutter head so that a plurality of rows of slits of the kind mentioned, for tranctionizing purposes, can be cut in transversely spaced relation all around the circumference of the tread portion of the tire, and means for driving one of said spindles, on each of said frames, the cutter teeth of one cutter head on each frame being in planes between the cutter teeth of the other cutter head, the slit cutting teeth which are of generally triangular form being provided in circular series, each series in circumferentially spaced relation on a cutter disk, the disks being assembled in coaxially spaced relation on a spindle with spacer washers therebetween limiting the depth of penetration of the cutting teeth.

11. Apparatus as set forth in claim 10 wherein the washers are of a smaller diameter in relation to the diameter of the cutter disks, but large enough to limit to a predetermined amount the extent of penetration of the teeth in cutting the slits.

12. Apparatus as set forth in claim 10 wherein the cutter disks are keyed to the spindle to prevent their turning relative thereto.

13. Apparatus as set forth in claim 10 wherein a plurality of said disks are placed in abutting relation with their cutting teeth in register to provide the desired width of cut.

* * * * *